Patented Sept. 10, 1929.

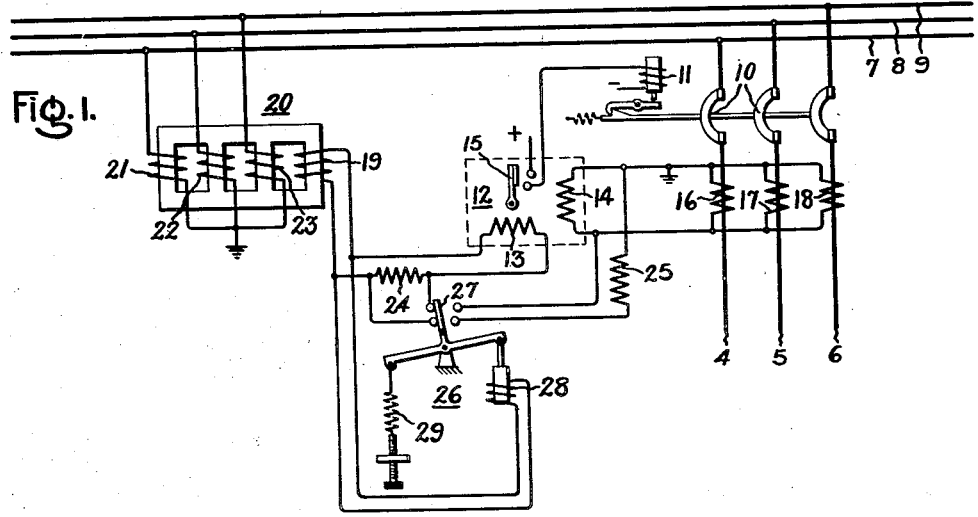
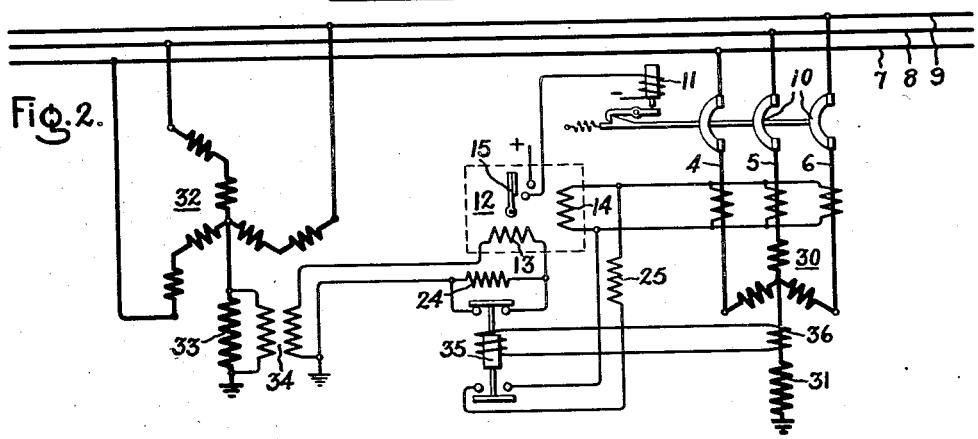
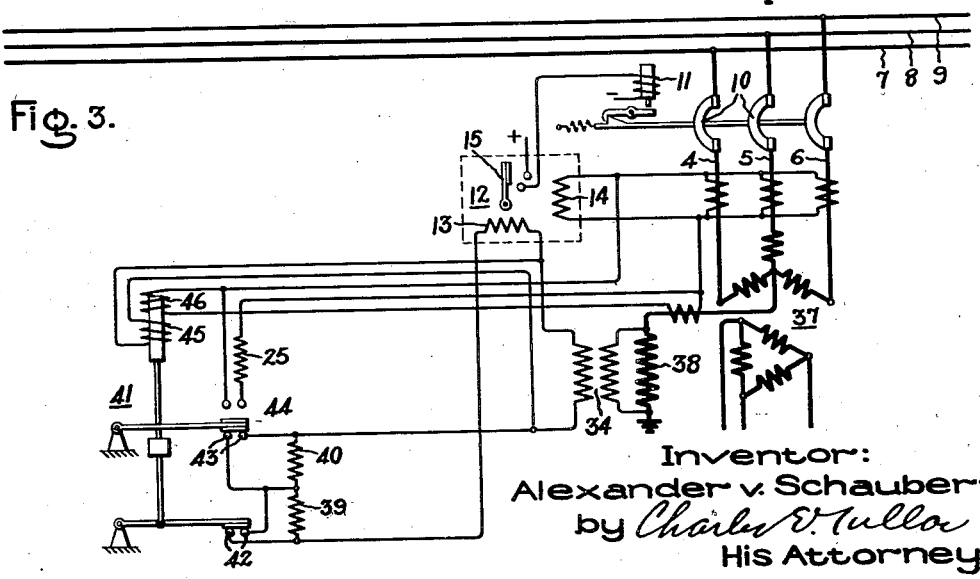
Inventor:
Alexander v. Schaubert;
by Charles V. Tullar
His Attorney.

1,728,024

UNITED STATES PATENT OFFICE.

ALEXANDER von SCHAUBERT, OF BERLIN, GERMANY, ASSIGNOR TO GENERAL ELECTRIC COMPANY, A CORPORATION OF NEW YORK.

PROTECTIVE ARRANGEMENT.

Application filed April 17, 1928, Serial No. 270,715, and in Germany May 27, 1927.

My invention relates to improvements in protective arrangements for electric systems and more particularly to arrangements for protecting electric circuits on the occurrence of ground faults and an object of my invention is to provide an improved arrangement whereby to control the sensitivity of response of the protective apparatus in accordance with the severity of the fault.

It is often desirable to hold a ground fault current to a predetermined value and for this purpose suitable current limiting devices inserted in a neutral to ground connection are sometimes employed. On the other hand in order to obtain the desired protection the protective apparatus must be sufficiently sensitive. This is particularly desirable with dynamo-electric machines having the neutral grounded in order to include in the protection the part of the windings adjacent the neutral, since the resultant voltage to ground is smaller the closer to the neutral the ground fault occurs. Also if the protective devices such as relays are made sufficiently sensitive to operate on relatively weak ground faults then in case of severe ground faults their windings may be subjected to destructive voltages and/or currents. Moreover, the operation of ground fault relays of the wattmeter type depends largely on the resultant voltage to ground because the ground fault current varies with this voltage. In addition the degree of effectiveness of the relay decreases with a decrease in voltage.

In accordance with my invention, I propose to avoid these troubles by varying the sensitivity of the protective devices through the medium of suitable current limiting means which are switched into or out of circuit with the windings of the protective device or otherwise suitably varied in dependence on the severity of the fault.

My invention will be better understood from the following description when considered in connection with the accompanying drawing and its scope will be pointed out in the appended claims.

In the accompanying drawing Fig. 1 illustrates diagrammatically a protective arrangement embodying my invention and Figs. 2 and 3 illustrate diagrammatically modifications of my invention.

In the protective arrangement shown in Fig. 1, a circuit comprising conductors 4, 5 and 6 is arranged to be connected to bus bars 7, 8, and 9 through a circuit breaker 10 which is shown as of the latched closed type provided with a trip coil 11. For controlling the circuit breaker 10 so as to effect the opening thereof on the occurrence of ground faults on the system, suitable electroresponsive means such as a relay 12 is provided. Relay 12 may be of the so-called wattmeter type and as shown comprises two cooperating windings 13 and 14 arranged through the circuit controlling member 15 to control the circuit of the trip coil 11. The winding 14 is connected to be energized in accordance with the sum of the currents in the conductors 4, 5, and 6. For this purpose, it may be connected across the terminals of the three parallel connected secondaries of the current transformers 16, 17, 18 respectively associated with the conductors 4, 5 and 6. The winding 13 is connected to be energized in accordance with the resultant voltage to ground of the system. For this purpose, it may be connected in circuit with the secondary winding 19 of a transforming means 20 herein shown as comprising a four branched magnetic core on three branches of which are arranged the primary windings 21, 22, 23 connected in star and to the bus bars 7, 8, and 9. The secondary winding 19, being on the fourth leg receives the resultant flux of the primary windings. With this arrangement it is obvious that the relay windings 13 and 14 are normally deenergized and become energized only on the occurrence of a ground fault which renders the resultant voltage to ground and the sum of the currents in the conductors 4, 5 and 6 other than zero.

In order to vary the sensitivity of the relay 12, I provide means for controlling the energization of one or more of its windings 13, 14 in accordance with the severity of the fault. As shown in Fig. 1 this means is of the current limiting type and includes impedances such as resistances 24 and 25 and electromagnetic means such as a control relay 26 arranged to control the circuits of the resistances 24 and 25 relatively to the windings 13 and 14 respectively. As shown the resistance 24 is arranged to be connected in series with the winding 13 and the resistance 25 in parallel with the winding 14, the relay 26 being provided with a contact controlling member 27 arranged to control the circuits of these resistances in its respective positions.

In order that the energization of the windings 13 and 14 may be controlled in accordance with the severity of the ground fault through the medium of the current limiting means 24 and 25, the control relay 26 may be of a type arranged to operate on the occurrence of a ground fault. For this purpose, it may have a winding 28 connected to be energized responsively to the resultant voltage to ground of the system as for example across the secondary winding 19 of the transforming means 20. Under normal conditions the winding 28 of the relay 26 is deenergized and the contact controlling member 27 is held in the position shown in Fig. 1 by suitable adjustable biasing means such as a spring 29 to short-circuit the resistance 24. The adjustment of the relay 26 will be such that, when the resultant voltage to ground is in excess of a predetermined value, the coil 28 will be energized sufficiently to overcome the tension of the spring 29 and open the short-circuit across the resistance 24 and connect the resistance 25 in parallel with the coil 14.

With this arrangement on the occurrence of a ground fault with a resultant voltage less than that for which the relay 26 is set to operate, a voltage proportional to the total resultant voltage will be impressed on the voltage responsive winding 13 and a current proportional to the sum of the line currents will energize the current responsive winding 14. Consequently the degree of sensitivity of the relay 12 would be at its greatest. On the occurrence, however, of a ground fault of such severity as to effect the operation of the relay 26, the short-circuit on the resistance 24 will be opened and the resistance 25 will be connected in parallel with the winding 14. This increases the effectiveness of both of these current limiting means and varies the sensitivity of the relay 12 which under these conditions does not have to be so great since both the potential and current available for operation are considerable. Since in this latter case the voltage on the relay winding 13 is cut down as is also the current through the relay winding 14 it will be apparent that the relay 12 may be designed for sensitive operation without the danger of its destruction in case of severe ground faults.

In the embodiment of my invention shown in Fig. 2, the star connected windings of a generator 30 are connected to the conductors 4, 5, and 6 and the neutral is grounded through a suitable current limiting means such as a resistance 31. In order to obtain the resultant voltage to ground of the system, a zigzag transformer 32 having its windings connected to the bus bars 7, 8 and 9 and its neutral point grounded through suitable voltage drop producing means such as a resistor 33 may be employed. The voltage responsive winding 13 of the relay 12 is connected in circuit with the secondary of a potential transformer 34 whose primary is connected across the resistor 33.

In this embodiment of my invention, the electro-magnetic means responsive to ground faults for controlling the sensitivity of the relay 12 is shown as a relay 35 which is connected to be energized on the occurrence of a ground fault on the system. For this purpose the control relay 35 is shown as connected in the neutral to ground connection of the generator 30 through suitable means such as a current transformer 36. The relay 35 normally short-circuits the current limiting means 24 in series with the potential winding 13 and may be arranged to connect in parallel with the current responsive winding 14 the resistance 25 and remove the short-circuit from the current responsive winding 13 on the occurrence of predetermined current in the neutral to ground connection of the generator 30. With this arrangement, it will be obvious that on the occurrence of a ground fault on the generator 30 so close to its neutral point that the voltage available to supply the ground current is small, the relay 35 will not operate. Consequently the relay 12 will be at its maximum sensitivity since both of the resistances 24 and 25 are ineffective. However, on the occurrence of ground fault current sufficient to actuate the relay 35, the resistances 24 and 25 will become effective to decrease the sensitivity of the relay 12 and also protect the windings thereof in case of a severe ground fault.

In the embodiment of my invention shown in Fig. 3, I have provided an arrangement whereby the sensitiveness of the earth fault relay 12 can be varied in steps by varying the effectiveness of the current limiting means in circuit with the relay windings by predetermined amounts. In this arrangement, I have show a star delta connected power transformer 37 with its star connected windings connected to the conductors 4, 5, and 6 and its neutal grounded through suitable means such as a resistance 38. The resultant voltage to ground in this case is obtained by a potential transformer 34 having its primary winding connected across the resistance 38. In order to control the effectiveness of the voltage responsive winding 13 of the relay 12, current limiting means such as resistance 39 and 40 are provided in circuit with the winding 13 and arranged to be switched in or out by the control relay 41 through its contacts 42 and 43 at different predetermined conditions of ground faults. The relay 41 also controls contacts 44 in the circuit of the current limiting means 25 of the current responsive winding 14. The relay 41 is shown as provided with two windings 45 and 46 which are connected to be energized in accordance with the resultant voltage to ground and the ground current respectively of the system.

Under normal conditions, the relay 41 is deenergized with its contacts 42 and 43 closed and its contacts 44 are open. This gives the relay 12 its maximum sensitivity. On the occurrence of a ground fault of a predetermined severity, the contacts 42 are opened but the contacts 43 remain closed. This removes the short-circuit from the resistance 39 and decreases the sensitivity of the relay 12. With a ground fault of greater severity, the contacts 43 are opened thus removing the short-circuit from the resistance 39 and further limiting the voltage to the winding 13, thereby again decreasing the sensitivity of the relay. With a still greater severity of ground fault, the contacts 44 are closed thus connecting in parallel with the current winding 14, its resistor 25 and still further reducing the sensitivity of the relay 12.

The ground fault responsive control means or relay 41 is advantageously so arranged as to render the ground fault relay 12 least sensitive when the resultant potential to ground exceeds a predetermined value for example 90% of the maximum. The current limiting means or resistances 25, 39 and 40 may be so dimensioned that the ground fault relay receives only a small part of the resultant voltage to ground and/or a ground fault current. This is particularly advantageous in avoiding the operation of the ground fault relay by false currents due to variations in transformer characteristics and the like. This is based on the fact that ground faults on overhead conductors and cables as shown by experience are more common and most usually have the resultant voltage to ground substantially the maximum. Consequently every ground fault relay of the system receives this voltage and most of the relays may possess an unnecessary sensitiveness as regards these false currents. However, by varying the limit of sensitiveness as set forth, the false operation of the relays which might occur by reason of the false currents is avoided since the sensitiveness of the relays is so decreased that only those relays which should respond are sufficiently sensitive to do so. The control relays 26, 35, 41 are preferably substantially instantaneous and are set to operate more quickly than the ground fault relays 12 whose sensitivity they control. Obviously one control relay can be used to vary the sensitiveness of one or more ground fault relays.

What I claim as new and desire to secure by Letters Patent of the United States is:

1. In combination with an electric circuit and a relay having two cooperating windings respectively connected to be energized in accordance with the resultant potential to ground of the conductors of the circuit and the sum of the currents in the conductors of the circuit, electroresponsive means connected to be energized on the occurrence of a ground fault on the circuit for controlling the energization of one of said windings.

2. In combination with an electric circuit and a relay having two cooperating windings respectively connected to be energized in accordance with the resultant potential to ground of the conductors of the circuit and the sum of the currents in the conductors of the circuit, electroresponsive means connected to be energized on the occurrence of a ground fault on the circuit for controlling the energization of both of said windings.

3. In combination with an electric circuit and a relay having a winding connected to be energized in accordance with the sum of the currents in the conductors of the circuit, means for decreasing the amount of sum current supplied to said winding on the occurrence of a ground fault of predetermined severity including electromagnetic means connected to be energized on the occurrence of a ground fault on the circuit for controlling the energization of said winding.

4. In combination with an electric circuit and a relay having two cooperating windings respectively connected to be energized in accordance with the resultant potential to ground of the conductors of the circuit and the sum of the currents in the conductors of the circuit, current limiting means connected in circuit with said windings, and electromagnetic means for controlling the circuit of said current limiting means arranged normally to reduce the effectiveness thereof and connected to be energized on the occurrence of a ground fault of predetermined severity to increase the effectiveness of said current limiting means.

5. In combination with an electric circuit and a relay having two cooperating windings respectively connected to be energized in accordance with the resultant potential to ground of the conductors of the circuit and the sum of the currents in the conductors of the circuit, current limiting means connected in circuit with said potential responsive winding, another current limiting means arranged to be connected in circuit with said current responsive winding, means for controlling the circuits of said current limiting means arranged normally to reduce the effectiveness of the current limiting means in circuit with said potential responsive winding and connected to be energized on the occurrence of a ground fault of predetermined severity to increase the effectiveness of the current limiting means in circuit with said windings.

6. In combination with an electric circuit and a relay having two cooperating windings respectively connected to be energized in accordance with the resultant potential to ground of the conductors of the circuit and the sum of the currents in the conductors of the circuit, a resistance connected in series with said potential responsive winding, another resistance arranged to be connected in parallel with said current responsive winding, means for controlling the circuits of said resistances on the occurrence of a ground fault of a predetermined severity arranged normally to short-circuit the resistance in series with the potential responsive winding and on the occurrence of a ground fault to open said short-circuit and to connect said other resistance in parallel with the current responsive winding.

7. In combination with an electric circuit and a relay having two cooperating windings respectively connected to be energized in accordance with the resultant potential to ground of the conductors of the circuit and the sum of the currents in the conductors of the circuit, current limiting means connected in circuit with said potential responsive winding, means for controlling the circuit of said current limiting means arranged normally to reduce the effectiveness thereof and connected to be energized on the occurrence of a ground fault of predetermined severity to increase the effectiveness of the current limiting means by successive predetermined amounts.

In witness whereof, I have hereunto set my hand this 31st day of March, 1928.

ALEXANDER von SCHAUBERT.